(12) United States Patent
Michelle et al.

(10) Patent No.: US 8,108,927 B2
(45) Date of Patent: Jan. 31, 2012

(54) SERIALIZED LOCK COMBINATION RETRIEVAL SYSTEMS AND METHODS

(75) Inventors: Deborah L. Michelle, Mission Viejo, CA (US); Prashant N. Urkudey, Upland, CA (US)

(73) Assignee: Targus Group International, Inc., Anaheim, CA (US)

( * ) Notice: Subject to any disclaimer, the term of this patent is extended or adjusted under 35 U.S.C. 154(b) by 574 days.

(21) Appl. No.: 12/238,004

(22) Filed: Sep. 25, 2008

(65) Prior Publication Data

US 2009/0083851 A1    Mar. 26, 2009

Related U.S. Application Data

(60) Provisional application No. 60/975,275, filed on Sep. 26, 2007.

(51) Int. Cl.
  *G06F 7/04* (2006.01)
  *G06F 9/00* (2006.01)
  *G06F 11/30* (2006.01)
(52) U.S. Cl. ............... 726/21; 713/2; 713/193
(58) Field of Classification Search ............ 726/21; 713/2, 193
  See application file for complete search history.

(56) References Cited

U.S. PATENT DOCUMENTS

| 7,012,503 B2 | 3/2006 | Nielsen |
| 7,731,088 B2 * | 6/2010 | Moynihan et al. ............ 235/384 |
| 2002/0178385 A1 | 11/2002 | Dent et al. |
| 2003/0061192 A1 * | 3/2003 | McGunn et al. .................. 707/1 |
| 2005/0190900 A1 * | 9/2005 | White et al. ............ 379/102.06 |
| 2007/0061460 A1 | 3/2007 | Khan et al. |
| 2008/0155053 A1 * | 6/2008 | Shen et al. .................... 709/217 |

OTHER PUBLICATIONS

International Search Report for International Application No. PCT/US2008/77665, filed Sep. 25, 2008.
Targus, A Notebook Is Stolen Every Two Minutes, Targus marketing and data sheet for DEFCON products, 2006.

* cited by examiner

*Primary Examiner* — Mohammad Reza
(74) *Attorney, Agent, or Firm* — Stoel Rives LLP; Matthew D. Thayne

(57) ABSTRACT

Disclosed are embodiments of systems and methods for retrieving combination lock codes in a secure environment. In some embodiments, each of a plurality of combination locks are linked with a serial code. A user may then enter user identity information into a retrieval system. After the system has validated the user identity information, the user may enter a serial code into the system, the serial code associated with a combination lock for which the user would like to retrieve a corresponding combination code. Upon receipt of the serial code from the user, the system may securely transmit a combination code associated with the desired combination lock to the user. In one embodiment, the secure transmission of the combination code is done by sending an electronic mail message to an electronic mail account of the user.

31 Claims, 4 Drawing Sheets

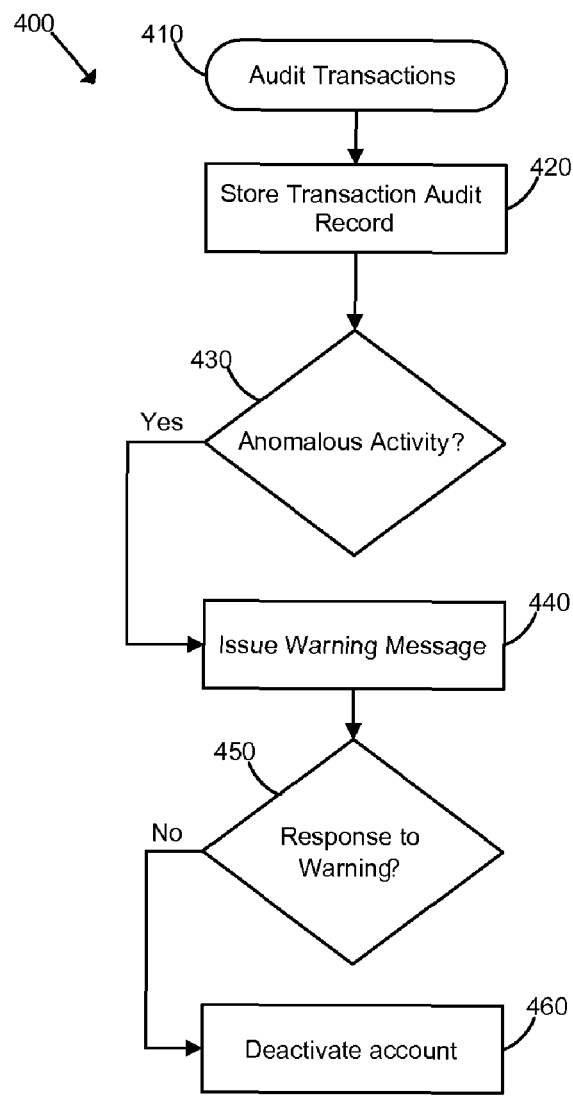
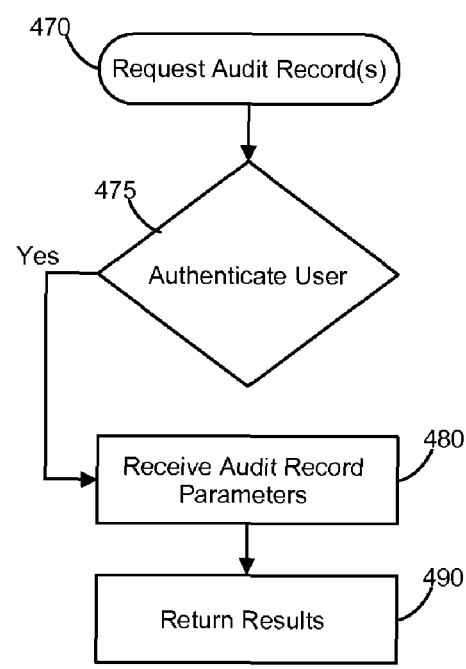
Figure 4b
Figure 4a

SERIALIZED LOCK COMBINATION RETRIEVAL SYSTEMS AND METHODS

RELATED APPLICATIONS

This application claims the benefit under 35 U.S.C. §119 (e) of U.S. Provisional Patent Application No. 60/975,275, filed Sep. 26, 2007, and titled "Serialized Lock Combination Retrieval Systems and Methods," which is incorporated herein by specific reference.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings in which:

FIGS. 4a and 4b are flow diagrams depicting a method for performing auditing in one embodiment of a serialized lock system.

DETAILED DESCRIPTION OF PREFERRED EMBODIMENTS

Figure 1A:
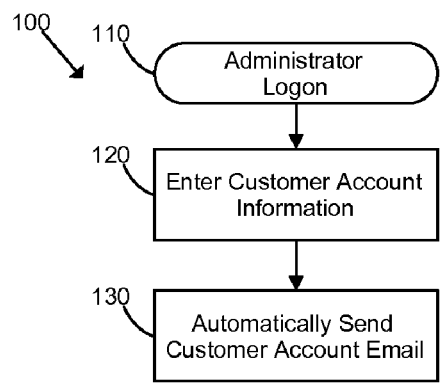
FIGS. 1a and 1b are flow diagrams of a processing method for adding users to one embodiment of a serialized lock system.

In the following description, numerous specific details are provided for a thorough understanding of specific preferred embodiments. However, those skilled in the art will recognize that the invention can be practiced without one or more of the specific details, or with other methods, components, structures, etc.

In some cases, well-known structures, details, or operations are not shown or described in detail in order to avoid obscuring aspects of the preferred embodiments. Furthermore, the described features, structures, or characteristics may be combined in any suitable manner in one or more embodiments.

Maintaining lock combinations can be a difficult task for some organizations, particularly where the organization manages a large number of locks. Generally, when an organization loses or forgets a particular lock combination, the organization must contact the lock vendor, or a locksmith, to open the lock and/or reacquire the combination. In order to reduce costs and increase efficiency, it would be desirable for lock vendors to provide a service to allow customers to securely access the combination of their locks without the need of directly contacting the lock vendor or a locksmith.

Some lock vendors have addressed this issue by selling lock systems having a common "master key" which will open any of the locks. However, such systems may present a security risk since it may be difficult to control access to the master key, and/or the master key itself may be misplaced. One or more embodiments of the invention disclosed herein may be designed to overcome these and/or other drawbacks of the prior art. As such, embodiments of systems and methods are disclosed herein in which a lock code may be retrieved by a user in a secure environment.

In some embodiments, each lock sold by a particular lock vendor may be assigned a unique serial number. This serial number may be used to associate the lock with a corresponding lock combination code. The lock vendor may provide a system (hereafter referred to as a "serialized lock system") where customers may enter a lock serial number and be provided with the lock combination code. The user interface of the serialized lock system may comprise a website accessible by web-browser software running on a personal computing device or cell phone. Alternatively, the user interface may, for example, be text or voice-based and may be accessible via telephone.

The locks usable with the systems described herein may comprise any lock including a combination for opening the lock, such as locks requiring input of a sequence of numbers or symbols to open the lock. The input of the sequence of numbers or symbols in such locks includes, but is not limited to, input of buttons, dials, keypads, electronic touch screens, etc. In some embodiments, the locks may also be coupled with a security device, such as a cable. In some embodiments, the locks may also be configured to be coupled with an electronic device, such as a computer, to secure the computer against theft and/or data access. For example, in some embodiments, the lock may be coupled with a security device configured to be inserted into a data port, such as a USB port, of a computer.

In some embodiments, the serial number for each lock sold may be printed or stamped directly on the lock itself. As such, the customer will always have the serial number as long as the customer has the lock itself. The combination for the lock may then be obtained via the retrieval system by providing secure customer information to the system.

In some embodiments, the lock vendor may create a database or directory of lock customers. Such a database or directory may comprise a relational database, X.509 directory, or the like. Customer accounts or data records may be created and managed by lock vendor personnel, such as a system administrator or regional sales manager. Each customer account may comprise a customer identifier and/or customer contact information, such as the customer phone number, email address, physical address, and/or a company identifier, such as a company name and contact information. Customer accounts may also comprise a password to authenticate customers' identities. In one embodiment, the customer email address may be used as the customer identifier. For example, a customer account for "John Smith," the Chief Operating Officer (COO) of "Smith Co." could comprise the following information: customer identifier=john.smith@smithco.com; customer address=1234 S. Main Street; customer phone= (555) 555-1234; company name=Smith Co. A customer account may also comprise the name of the region where the customer is located. This region information may be based upon the sales regions of the lock vendor. In addition, a customer account may comprise the name of a sales manager or regional sales manager assigned to the customer. A customer account or data record may comprise any data storage and/or retrieval technique known in the art.

In some embodiments, more than one customer account may be associated with a company. Company information, such as company contact information, region, assigned sales manager, and the like, may be stored in a separate company data record. Multiple customer accounts may be linked to and/or associated with a single company data record. This may allow multiple customer accounts to access lock information registered to the company. For example, a company may want several of its employees to be able to access lock combination information. In this case, there could be several customer accounts associated with a single company. For clarity, as used herein, a "customer account" may refer to a customer account comprising company-identifying information, may refer to an individual customer account linked to company-identifying information, or may refer to an individual customer account that is not linked company-identifying information.

Once an account is created, lock serial numbers may be registered to customers. Lock vendor personnel, such as a regional sales manager, may associate lock serial numbers with a company when new sales are made using the system. The serial number of each lock purchased by the customer may be individually registered to the purchasing company. This registration may comprise, for example, storing the serial number in a data field of a customer account and/or company data record or may comprise linking a serial number data record to a customer account and/or company data record. As used herein, a "serial number data record" may comprise any data storage and/or retrieval technique known in the art.

In some embodiments, a "batch registration" of locks may be performed. Locks may be sold in groups or "batches" containing multiple locks. Such batches may comprise computer readable media, such as a Compact Disk (CD), Universal Serial Bus (USB) key, or the like containing a listing of lock serial numbers in the batch. This computer readable media may comprise a "media identifier" value. The media identifier value may allow the system to associate each lock serial number in the batch to the media identifier value. Accordingly, the serial numbers of an entire batch of locks may be registered to a customer by associating the customer account and/or company data record with the media identifier of the batch.

In order to access a lock combination, a user may logon to the serialized lock system by providing a user identifier and password, for example. After authenticating, the user may enter a lock serial number. The serialized lock system may then determine whether the serial number is registered to a customer account and/or company. If the serial number is registered, the system may determine whether the user is associated with that customer account and/or company. If not, the system may refuse to provide the lock combination to the user. If the user is associated with the customer account and/or company, or if the provided serial number is not yet registered, the system may provide the lock combination to the user. The combination may be provided to the user in a number of different ways including, but not limited to, sending an email message to a registered email address of the user.

In some embodiments, only high level contacts at a company, such as the company's IT manager, may be provided with an account to look up serial numbers. In such embodiments, if the user has forgotten a combination, he or she will need to have the IT manager access the lock combination. In other embodiments, each individual who is issued a lock at a particular company may be set up with an account to access the system, in which case each employee would have the ability to look up the combination number for their lock by using the retrieval system.

It should also be understood that numerous variations will be apparent to those of ordinary skill in the art after having received the benefit of this disclosure. For example, a master list of serial number/combinations for each company may be maintained in a database, rather than storing them individually. The master list may have a code associated therewith. In such embodiments, each customer account or an appropriate person's account at the company may be able to enter the code and receive and list of serial numbers and/or combinations associated with the master code. As another alternative, instead of sending an email to a user account with combination code information, the system may be configured to transmit the combination code securely to the user in another manner, such as by transmitting a message with the combination code to another user account, such as by sending a text message to the user's mobile telephone, leaving a message on another messaging system (such as leaving a voice mail message), or the like. As still another alternative, instead of storing a plurality of serial numbers and a corresponding plurality of combination codes and electronically linking the stored serial numbers with the stored combination codes, the system may be configured with an algorithm that automatically generates the appropriate combination code for a particular combination lock from the serial number itself. For example, a hash algorithm may be used to generate unlock combinations for each lock using the serial numbers on the lock.

In one example of a method for facilitating retrieval of combination codes for serialized combination lock, at least one of a plurality of serial codes may be linked with a corresponding combination code. User identity information may then be received from a user, after which the user identity information may be validated by the system. If the user identity information is validated, a serial code may also be received from the user. The system may then securely transmit a combination code associated with at least one of the combination locks to the user. In some embodiments, the step of securely transmitting a combination code associated with at least one of the combination locks may comprise transmitting a message with a combination code to a user account of the user. In other embodiments, the step of transmitting a message with a combination code to a user account of the user may comprise sending an electronic mail message to the user, may comprise sending a text message to the user's mobile telephone, or may comprise leaving a voice mail message to the user in a messaging system.

Linking at least one of a plurality of serial codes with a corresponding combination code may comprise, for example, using an algorithm to generate a combination code from a serial code, or may comprise storing serial codes for a plurality of combination locks, storing combination codes for each of the plurality of combination locks, and electronically linking the stored serial codes with the stored combination codes.

In some embodiments, audit data regarding a transaction by the user to access a combination code may be stored. Audit data may comprise, for example, user identity information, an Internet Protocol (IP) address of a computer requesting the combination code, the time of the transaction, and/or the date of the transaction. Some embodiments may also be configured to attempt to validate user identity information from a user and may be configured to store audit data regarding the second user. The step of storing audit data may be initiated in response to an indication that an attempt to validate the user identity information has failed.

In other embodiments, at least a subset of the plurality of serial codes may be linked with company identity information. User identity information may also be linked with company identity information. In such embodiments, the method may comprise attempting to match the serial code received from the user with company identity information linked with the user identity information received from the user. User access by the user may also be terminated in response to determining that the serial code received from the user does not match the company identity information linked with the user identity information received from the user.

In one example of a system for facilitating retrieval of combination codes for serialized combination locks, a user interface for receiving user identity information from a user may be provided. A user validation component for validating the user identity information, may also be provided. The user identity information may be associated with at least one of a plurality of combination locks. A user interface for receiving a serial code from the user may also be provided, along with a transmission component for securely transmitting a combination code associated with at least one of the combination locks to the user. In some embodiments, a combination code generation component may also be provided. The combination code generation component may be configured to use an algorithm to generate a combination code from the serial code received from the user. The user interface for receiving user identity information from a user may be, but need not be, the same as the user interface for receiving a serial code from the user. The user validation component may be configured to match the serial code with company identity information linked with the user identity information. In other embodiments, an audit component configured to store audit data regarding a transaction by the user to access a combination code may also be provided. The audit component may be further configured to initiate an audit in response to an indication that an attempt to validate user identity information from a user has failed. Alternatively, the audit component may be configured to initiate an audit in response to an indication that an attempt to match a serial code with company identity information has failed.

Turning now to the accompanying figures, various embodiments of the invention will now be described in greater detail. In FIG. 1a, a flow diagram 100 depicts the registration of a new customer account under one embodiment of a serialized lock system. At step 110, a system administrator, such as a regional sales manager, may logon to the system. At step 120, the system administrator may enter customer registration information into the system. As discussed above, a customer account may comprise a customer identifier, customer contact information, and/or a password. When a user is created, the system may automatically generate a password for the user. At step 130, an email message may be sent to the customer indicating that a customer account on the serialized lock system has been created. The email sent at step 130 may include the customer identifier and password and may also request that the customer logon to the system to change the customer account password. The email message sent at step 130 may also comprise a link to the serialized lock system website.

In some embodiments, lists of all customer accounts for a particular company may be sent periodically to an appropriate individual or individuals. For example, at regular intervals—such as once a month, once a quarter, etc.—a primary contact of company may be sent a comprehensive list of each of the customer accounts registered under the company's account. This individual (or individuals) may also have an ability to retrieve a list of active accounts associated with his/her company for an internal audit by logging in to the system and making a manual request for this information.

Figure 1B:
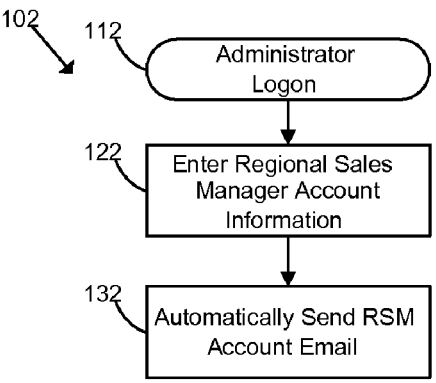

Turning now to FIG. 1b, a flow diagram 102 depicts the registration of a new regional sales manager account under one embodiment of a serialized lock system. At step 112, a system administrator may logon to the system. At step 122, the system administrator may enter regional sales manager account information into the system. A regional sales manager account may comprise a name, user identifier, password, title, assigned sales region, contact information, and/or the like. A temporary password may be assigned to the new regional sales manager account at step 122, which the user may later change. At step 132, an email message may be sent to the regional sales manager informing him/her that an account on the system has been created. The email sent at step 132 may include the regional sales manager identifier and password and may request that the regional sales manager logon to the system to change his/her account password. The email message sent at step 132 may also comprise a link to the serialized lock system website.

Figure 2:
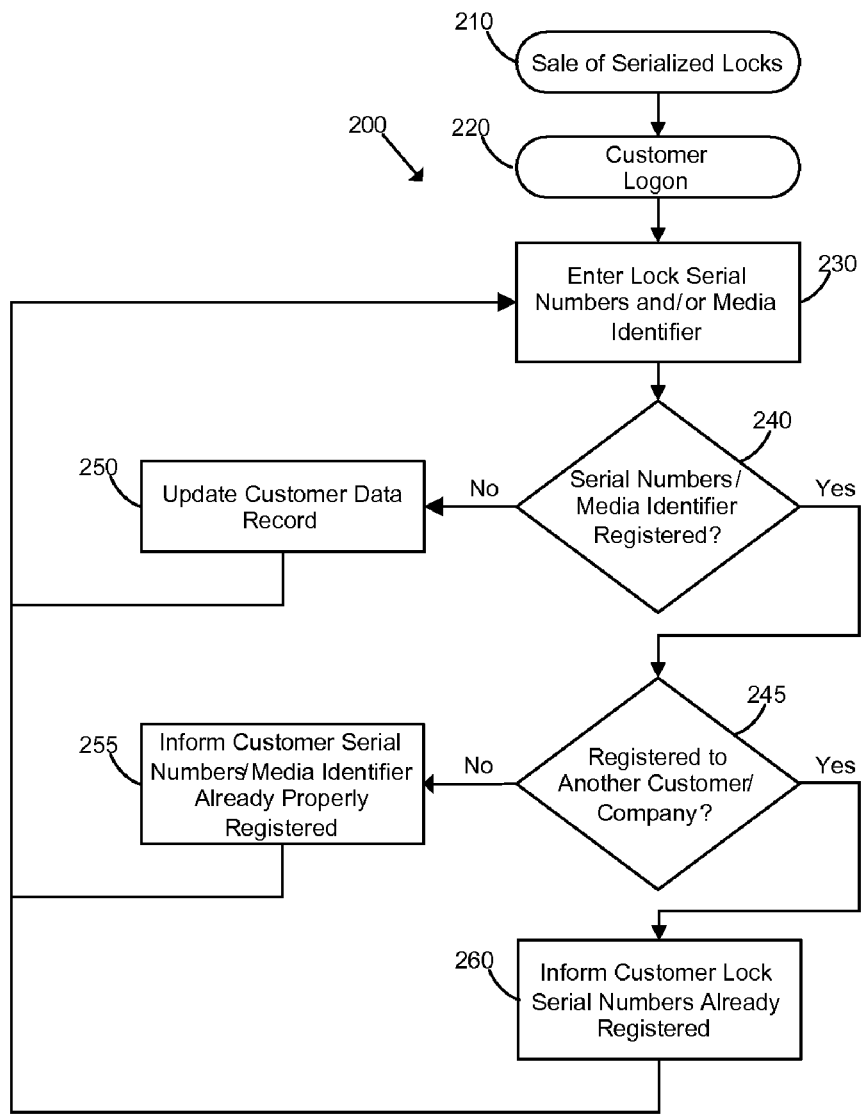
FIG. 2 is a flow diagram of a processing method for registering a lock serial number to a customer in one embodiment of a serialized lock system.

Turning now to FIG. 2, a flow diagram depicts the registration of lock serial numbers to a customer and/or company in one embodiment of a serialized lock system. At step 210, a system administrator, such as a regional sales manager, may sell a batch of locks to a customer. At step 220, the customer who purchased the locks sold at step 210 may logon to a customer account. A regional sales manager and/or a system administrator may create a customer/company account for the purchaser when the locks are sold at step 210 if such an account does not yet exist. At step 220, the user may provide a customer identifier (e.g., email address) and/or password to the system. The serialized lock system may authenticate the provided information and grant access to the user if the system validates the provided customer identifier and/or password.

At step 230, the customer may enter a listing of lock serial numbers and/or a media identifier. At step 240, the serialized lock system may determine whether the provided serial numbers and/or media identifier have already been registered to a customer account and/or company. If so, the flow may continue at step 245; otherwise, the flow may continue at step 250.

At step 250, the serialized lock system may register the lock serial numbers and/or media identifier to the user's customer account and/or company as described above. The flow may then continue to step 230 where the user may register additional serial numbers and/or media identifiers.

At step 245, the serialized lock system may determine whether the serial numbers and/or media identifiers have been registered to the user's customer account and/or company. If so, the flow may continue to step 255. Otherwise, the flow may continue to step 260.

At step 255, the user may be informed that the provided serial numbers have already been registered to his/her customer account and/or company. The flow may then continue to step 230 where the user may register additional serial numbers and/or media identifiers.

At step 260, the user may be informed that the provided serial numbers and/or media identifier have already been registered to another customer and/or company and, as such, may not be registered to the users' account and/or company. The user may also be instructed to contact his or her sales representative to resolve the issue. The flow may then continue to step 230 where the user may register additional serial numbers and/or media identifiers.

Figure 3:
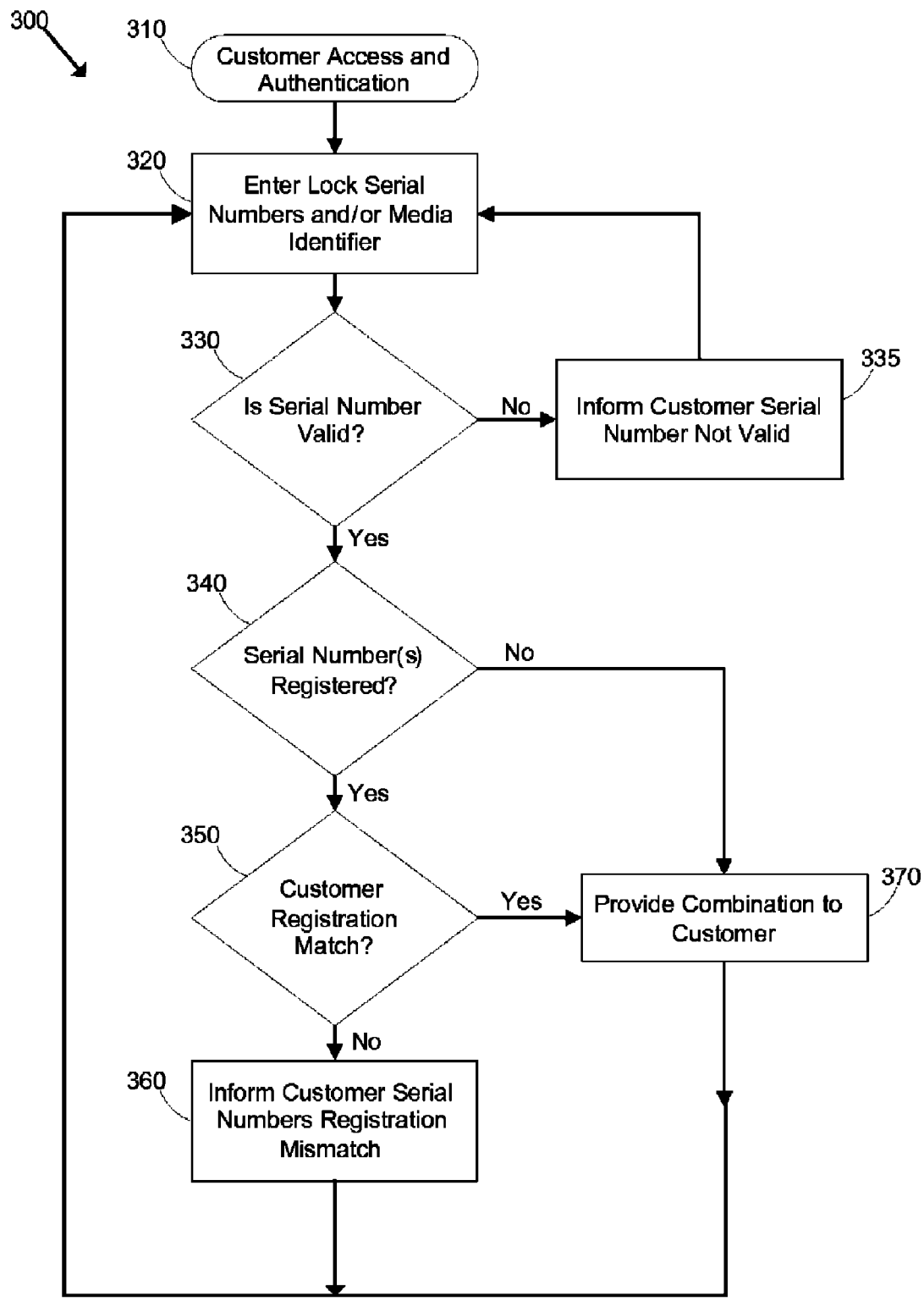
FIG. 3 is a flow diagram of a processing method for obtaining a lock combination from a serial number in one embodiment of a serialized lock system.

Turning now to FIG. 3, a flow diagram depicts the access of a lock combination by a customer in one embodiment of a serialized lock system. At step 310, a customer may access the serialized lock system by providing a customer identifier (e.g., email address) and/or password. At step 310, the serialized lock system may authenticate the provided information, and the flow may continue to step 320. If the system is unable to authenticate the user at step 310, the user may be denied access, and the flow may terminate.

At step 320, the user may enter a lock serial number. At step 330, the serialized lock system may determine whether the serial number is valid. This may be done by checking the format of the serial number to determine whether it is properly formatted (e.g., contains the proper number of digits and/or is within a pre-determined number range). If the serial number is valid, the flow may continue at step 340. Otherwise, the user is informed that the serial number is invalid and cannot be processed. The flow may then return to step 320 where the user may re-enter the serial number.

At step 340, the serialized lock system determines whether the requested serial number has been registered to a customer account and/or company. If so, the flow may continue at step 350. If the serial number has not been registered to a customer account and/or company, the flow may continue to step 370.

If the serial number has been registered to a customer account and/or company, at step 350, the serialized lock system may determine whether the user matches the customer account and/or company to which the lock serial number is registered. If the information matches, the flow may continue at step 370. If the registration information does not match, the flow may continue at step 360.

At step 360, the user may be informed that the provided serial number has already been registered, the registration does not match, and that the combination will not be provided. At step 360, the customer may also be asked to contact the lock vendor to resolve the issue. The flow may then continue at step 330 to allow the user to enter additional lock serial numbers.

At step 370, the serialized lock system may provide the lock combination to the user. This may be done by sending an email to the customer containing the combination, displaying the combination on the user's computer screen, by audio, or the like. Alternatively, the system may be configured to send another message, such as a text message or voice mail message, to an account of the user, such as to a cell phone. The flow may then continue at step 330 to allow the user to enter additional lock serial numbers.

In some embodiments, each time a customer logs on to the system, or at a customer's request, the customer may be provided with a date and/or time of the customer's most recent log on. Additionally, or alternatively, the customer may be provided with information about unsuccessful attempts to log on using some customer identifier that can be linked with the customer. Information regarding the IP address of the previous log on and/or log on attempts may also be provided. These features may allow customers the ability to be informed of unauthorized attempts to access combination number information.

Turning now to FIGS. 4a and 4b, two flow diagrams depict a method for performing auditing in one embodiment of a serialized lock system. At step 410, the serialized lock system may generate an audit record for each of the transactions illustrated in FIGS. 1-3. The serialized lock system may audit the activities of system administrators, sales representatives, and/or customers. Such auditing may comprise storing transactions comprising requests made and the resulting response. Audited transactions may include, but are not limited to: user authentication attempts, user logins, requests to register lock serial numbers, requests for lock combinations, requests to add new customers, and the like. An audit record may comprise the transaction, the source of the transaction (such as an internet protocol (IP) address of a computer requesting the transaction), the time and date of the transaction, and the like.

At step 420, the audits generated at step 410 may be stored in a data storage and retrieval system. Any data storage and retrieval system known in the art may be used to store the audit records collected at step 410.

At step 430, the method may monitor the stored audit records to detect anomalous activity. What constitutes anomalous activity may be determined by the lock vendor and/or system administrator. It would be understood by one skilled in the art that any number of triggers could be used to detect anomalous activity including, but not limited to: invalid login attempts, usage of the system during certain times and dates, usage of the system from unauthorized locations (e.g., access from a computer located in a foreign country).

At step 440, the system may issue a warning message to a customer, company, and/or lock vendor personnel regarding the anomalous activity detected at step 430. The warning message issued at step 440 may comprise a response requirement. This response requirement may require the recipient to logon to the system and/or contact lock vendor personnel to verify the anomalous activity.

At step 450, the system may determine whether the user has complied with the response requirement of step 440. If the user has not, the flow may continue to step 460. Otherwise, the flow may terminate.

At step 460, the customer and/or company account associated with the anomalous activity identified at step 430 may be deactivated. In one embodiment, the deactivation of step 460 may comprise denying the customer/company access to the serialized lock combination retrieval system. Alternatively, if the customer/company and/or lock vendor personnel consider the anomalous activity to pose a serious security threat (e.g., an unauthorized and/or fraudulent user accessing a large number of lock combinations), the customer/company account may be deactivated without issuing a warning message at step 440 or waiting for a response at 450.

At step 470, a request for audit records pertaining to a customer, company, or lock vendor personnel (such as a regional sales manager) may be received. At step 475, the system may require the user to authenticate his or her identity. Authentication of the user's identity may comprise verifying receiving a user identifier and password. If the user's identity is authenticated at step 475, the flow may continue at step 480. Otherwise, the user may be denied access, and the flow may terminate.

At step 480, the user may request audit records. The user request of step 480 may comprise specifying a time, date, and/or transaction range to search for within the audit records obtained at step 410 and stored at step 420. If the user is an employee of the lock vendor, such as a sales manager or system administrator, the user may specify which customer accounts and/or companies to include in the audit records search. If the user is a system administrator or high-level sales manager, the user may request audit records pertaining to a regional sales manager, or any other users of the system. In searching the audit records, access may be limited to an area of responsibility. For example, a regional sales manager may only be able to access audit records for customers/companies within his/her assigned region and a high-level sales manager may only be able to access the audit records of regional sales managers in regions he/she supervises.

At step 490, the user may receive the results of the audit records search, if any, and the flow may terminate. In some embodiments, one or more high-level contacts at a particular company may also have access to the audit reports for their company. For example, the system may be configured such that the account of a primary contact for a particular company allows the primary contact to retrieve audit records and/or conduct audits to create audit records. Administrators and/or high-level company contacts may also be given the ability to audit "suspicious" activities (i.e., multiple attempts to retrieve combinations for a locks registered to another company). Triggers may also be configured to automatically send information regarding such suspicious activities to an administrator and/or a high-level company contact.

Some embodiments may be configured such that the audit reports, or any other reports using data generated by one or more of the embodiments described herein, can now be exported into an external data processing program, such as Microsoft Excel®.

Figure 5:
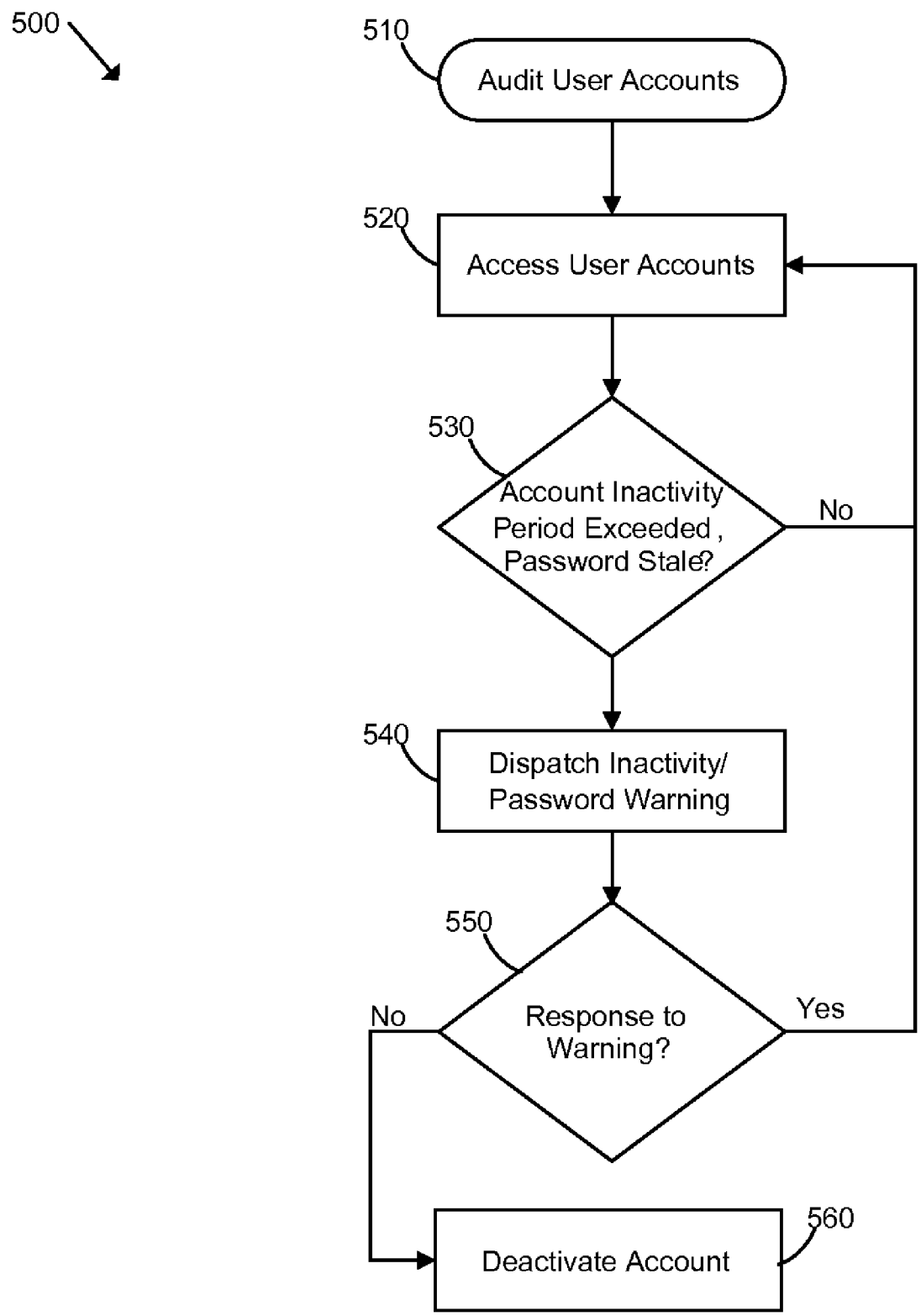
FIG. 5 depicts a method for maintaining customer and/or company accounts in one embodiment of a serialized lock system.

Turning now to FIG. 5, a flow diagram depicts a method for maintaining customer and/or company accounts in one embodiment of a serialized lock system.

At step 510, the system may periodically monitor the customer and/or company accounts stored on the system. The monitoring period of step 510 may be specified by lock vendor personnel, such as a system administrator, and may be performed daily, weekly, or at some other time interval.

At step 520, audit records associated with each customer and/or company account on the system may be accessed to determine the most recent successful login by the user. From this value, an inactivity period for the customer/company account may be determined. For instance, if a customer last logged into the system a month ago, the inactivity period for that user would be one month.

At step 530, the inactivity period of the user may be compared to an inactivity threshold value. If the user's inactivity period is greater than the inactivity threshold value of step 530, the flow may continue at 540. At step 530, the password of the user may be audited. In one embodiment, users of the system may be required to change their user password intermittently, such as once every six months. In this case, if the system indicates that the password has not been changed within a threshold period of time, the flow may continue to step 540. If the account has not been inactive and the password has been recently updated, the flow may terminate and/or continue evaluating other customer/company accounts at 520.

At step 540, an inactivity and/or password update warning may be dispatched to the user. This warning may comprise an email message, voice message, or the like. The warning may inform the user that his/her account has been idle for beyond the acceptable inactivity period and/or the account password is due to expire. The message may instruct the user that, in order to preserve access to the system, the user must logon and/or update his/her password. After dispatching the warning message, the flow may continue to step 550.

At step 550, the system may detect a subsequent login and/or password update by the user warned at step 540. If the warned user logs onto the system and/or updates his/her password within the time period specified by the warning message dispatched at 540, the flow may terminate or continue at 520 where additional users may be checked. Otherwise, the flow may continue to step 560.

At step 560, if the customer/company does not logon and/or update his/her password to the system within the period of time specified by the warning message dispatched at step 540, the customer/company account may be deactivated. For example, the warning message of step 540 may indicate that the account will be deactivated if the user does not logon and/or update his/her password to the system within 5 days. If the user does not login within this time, step 560 may deactivate the account. In one embodiment, deactivating a user account may comprise disallowing login to the account until it is reactivated by a system administrator and/or regional sales manager.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. The scope of the present invention should, therefore, be determined only by the following claims.

The invention claimed is:

1. A method for facilitating retrieval of combination codes for serialized combination locks from a serialized lock computer system, each of the plurality of combination locks having a serial code and a combination code associated therewith, the method comprising:
   linking, by the serialized lock computer system, at least one of a plurality of serial codes with a corresponding combination code;
   receiving, at the serialized lock computer system, user identity information from a user computer system;
   validating, at the serialized lock computer system, the user identity information, wherein the user identity information is associated with at least one of the combination locks;
   receiving, at the serialized lock computer system, a serial code from the user from the user computer system; and
   securely transmitting, by the serialized lock computer system, to a user account of a user of the user computer system, a message comprising a combination code associated with at least one of the combination locks.

2. The method of claim 1, wherein the step of transmitting a message comprising a combination code to a user account of a user of the user computer system comprises sending an electronic mail message to the user.

3. The method of claim 1, wherein the step of transmitting a message comprising a combination code to a user account of a user of the user computer system comprises sending a text message to the user's mobile telephone.

4. The method of claim 1, wherein the step of transmitting a message comprising a combination code to a user account of a user of the user computer system comprises leaving a voice mail message to the user in a messaging system.

5. The method of claim 1, wherein the step of linking at least one of a plurality of serial codes with a corresponding combination code comprises using, by the serialized lock computer system, an algorithm to generate a combination code from a serial code.

6. The method of claim 1, wherein the step of linking at least one of a plurality of serial codes with a corresponding combination code comprises storing serial codes for a plurality of combination locks, storing combination codes for each of the plurality of combination locks, and electronically linking the stored serial codes with the stored combination codes by the serialized lock computer system.

7. The method of claim 1, further comprising storing, by the serialized lock computer system, audit data regarding a transaction by the user to access a combination code.

8. The method of claim 7, wherein the audit data comprises at least one of the user identity information, an Internet Protocol (IP) address of a computer requesting the combination code, the time of the transaction, and the date of the transaction.

9. The method of claim 1, further comprising:
receiving, at the serialized computer system, user identity information from a second user;
attempting, by the serialized computer system, to validate the user identity information from the second user; and
storing, at the serialized computer system, audit data regarding the second user.

10. The method of claim 9, wherein the step of storing audit data regarding the second user is initiated by the serialized computer system in response to an indication that the attempt to validate the user identity information from the second user has failed.

11. The method of claim 1, further comprising:
linking, by the serialized computer system, at least a subset of the plurality of serial codes with company identity information; and
linking, by the serialized computer system, user identity information with company identity information.

12. The method of claim 11, further comprising attempting, by the serialized computer system, to match the serial code received from the user computer system with company identity information linked with the user identity information.

13. The method of claim 12, further comprising terminating, by the serialized computer system, user access by the user in response to determining that the serial code received from the user computer system does not match the company identity information linked with the user identity information.

14. A system for facilitating retrieval of combination codes for serialized combination locks, each of the plurality of combination locks having a serial code and a combination code associated therewith, the system comprising:
a user interface generated by a processor for receiving user identity information from a user;
a user validation component executable on a processor for validating the user identity information, wherein the user identity information is associated with at least one of a plurality of combination locks;
a user interface generated by a processor for receiving a serial code from the user; and
a transmission component for securely transmitting a message comprising a combination code associated with at least one of the combination locks to an account associated with the user.

15. The system of claim 14, further comprising a combination code generation component executable on a processor, wherein the combination code generation component is configured to use an algorithm to generate a combination code from the serial code received from the user.

16. The system of claim 14, wherein the user interface for receiving user identity information from a user is the same as the user interface for receiving a serial code from the user.

17. The system of claim 14, wherein the user validation component is further configured to match the serial code with company identity information linked with the user identity information.

18. The system of claim 14, further comprising an audit component executable on a processor configured to store audit data regarding a transaction by the user to access a combination code.

19. The system of claim 18, wherein the audit data comprises at least one of the user identity information, an Internet Protocol (IP) address of a computer requesting the combination code, the time of the transaction, and the date of the transaction.

20. The system of claim 18, wherein the audit component is further configured to initiate an audit in response to an indication that an attempt to validate user identity information from a user has failed.

21. The system of claim 18, wherein the audit component is further configured to initiate an audit in response to an indication that an attempt to match a serial code with company identity information has failed.

22. A non-transitory computer-readable medium including computer program instructions that cause a computer to implement a method, the method comprising:
receiving user identity information from a user;
validating the user identity information, wherein the user identity information is associated with at least one of a plurality of combination locks, each of the plurality of combination locks having a serial code and a combination code associated therewith;
receiving a serial code from the user;
linking the serial code with a corresponding combination code; and
securely transmitting a message comprising the corresponding combination code to a user account of the user.

23. The non-transitory computer-readable medium of claim 22, wherein the step of transmitting a message with a combination code to a user account of the user comprises sending an electronic mail message to the user.

24. The non-transitory computer-readable medium of claim 23, wherein the step of transmitting a message with a combination code to a user account of the user comprises sending a text message to the user's mobile telephone.

25. The non-transitory computer-readable medium of claim 22, wherein the step of transmitting a message with a combination code to a user account of the user comprises leaving a voice mail message to the user in a messaging system.

26. The non-transitory computer-readable medium of claim 22, wherein the step of linking the serial code with a corresponding combination code comprises using an algorithm to generate the corresponding combination code from the serial code.

27. The non-transitory computer-readable medium of claim 22, wherein the step of linking the serial code with a corresponding combination code comprises storing serial codes for a plurality of combination locks, storing combination codes for each of the plurality of combination locks, and electronically linking the stored serial codes with the stored combination codes.

28. The non-transitory computer-readable medium of claim 22, further comprising storing audit data regarding a transaction by the user to access a combination code.

29. The non-transitory computer-readable medium of claim 22, wherein the method further comprises:
receiving user identity information from a second user;
attempting to validate the user identity information from the second user; and
storing audit data regarding the second user.

30. The non-transitory computer-readable medium of claim 29, wherein the step of storing audit data regarding the second user is initiated in response to an indication that the attempt to validate the user identity information from the second user has failed.

31. A method for facilitating retrieval of combination codes for serialized combination locks, each of the plurality of combination locks having a serial code and a combination code associated therewith, the method comprising:
- receiving user identity information from a user;
- validating the user identity information, wherein the user identity information is associated with at least one of a plurality of combination locks, each of the plurality of combination locks having a serial code and a combination code associated therewith;
- receiving a serial code from the user;
- linking the serial code with a corresponding combination code by using an algorithm to generate a combination code from the serial code received from the user;
- securely transmitting the combination code via electronic mail to the user; and
- storing audit data regarding the user's retrieval of the combination code.

* * * * *